(12) United States Patent
Spears et al.

(10) Patent No.: US 7,253,427 B2
(45) Date of Patent: Aug. 7, 2007

(54) AUTOMATIC OBJECT PLANE DETECTION SYSTEM AND METHOD

(75) Inventors: Kurt E. Spears, Fort Collins, CO (US); Rodney C. Harris, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/988,870

(22) Filed: Nov. 15, 2004

(65) Prior Publication Data

US 2006/0065858 A1 Mar. 30, 2006

(51) Int. Cl.
*G01N 21/86* (2006.01)
*G01V 8/00* (2006.01)
*G06K 9/36* (2006.01)

(52) U.S. Cl. .................. 250/559.38; 250/559.27; 382/291

(58) Field of Classification Search .......... 250/559.29, 250/559.27, 559.38, 559.19; 356/4.03; 382/291
See application file for complete search history.

(56) References Cited

U.S. PATENT DOCUMENTS

| | | | | |
|---|---|---|---|---|
| 5,978,102 A | * | 11/1999 | Matsuda | 358/474 |
| 5,987,163 A | | 11/1999 | Matsuda | |
| 6,556,945 B1 | * | 4/2003 | Burggraf et al. | 702/159 |
| 6,781,676 B2 | * | 8/2004 | Wallace et al. | 356/4.03 |
| 7,006,236 B2 | * | 2/2006 | Tomasi et al. | 356/614 |
| 7,030,402 B2 | * | 4/2006 | Yamaguchi et al. | 250/559.38 |
| 2003/0226956 A1 | | 12/2003 | Rush | |

FOREIGN PATENT DOCUMENTS

| | | |
|---|---|---|
| EP | 1221811 | 7/2002 |
| JP | 59226805 | 12/1984 |
| JP | 05215528 | 8/1993 |
| JP | 2001280951 | 10/2001 |

* cited by examiner

*Primary Examiner*—Thanh X. Luu
*Assistant Examiner*—Brian J Livedalen

(57) ABSTRACT

An object plane detection system comprises a light source adapted to illuminate a media object to generate an image area on a photosensitive sensor. The system also comprises a detection module adapted to determine a location of an object plane corresponding to the media object based on a size of the image area.

42 Claims, 4 Drawing Sheets

AUTOMATIC OBJECT PLANE DETECTION SYSTEM AND METHOD

BACKGROUND OF THE INVENTION

Scanning systems are used in a variety of different applications and products, such as copiers, facsimile machines, and scanners. However, different types of scanning media generally result in different types of scanning problems. For example, scanned locations near the spine of a bound volume often appear darker, and text therein more compressed, than in adjacent locations because of distance variations between the bound volume and a platen or scanning object plane. Thus, scanned media readability varies as a result of nonuniformities or variations in the object plane location.

SUMMARY OF THE INVENTION

According to one embodiment of the present invention, an object plane detection system comprises a light source adapted to illuminate a media object to generate an image area on a photosensitive sensor. The system also comprises a detection module adapted to determine a location of an object plane corresponding to the media object based on a size of the image area.

According to another embodiment of the present invention, an object plane detection method comprises illuminating an image area on a photosensitive sensor via light reflected from a media object. The method also comprises determining a location of an object plane corresponding to the media object based on a size of the image area.

According to another embodiment of the present invention, an object plane detection system comprises a focused light source adapted to illuminate a portion of a media object to generate an image area on a photosensitive sensor. The system also comprises a detection module adapted to determine a location of an object plane corresponding to the media object based on the image area exposed on the photosensitive sensor.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
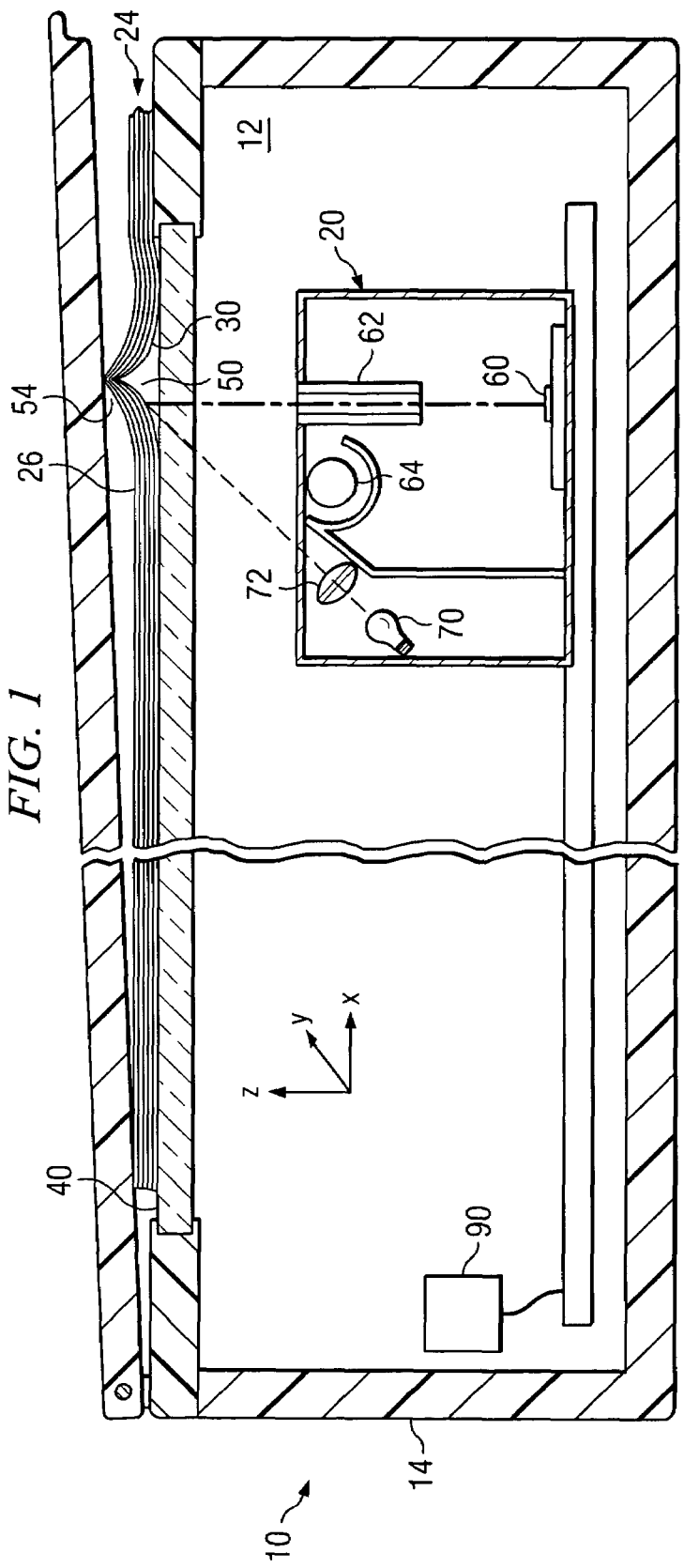
FIG. 1 is a diagram illustrating a scanning device in which an embodiment of an automatic object plane detection system in accordance with the present invention is illustrated.

FIG. 1 is a diagram illustrating a scanning device 10 in which an embodiment of an automatic object plane detection system 12 in accordance with the present invention is illustrated. In the embodiment illustrated in FIG. 1, scanning device 10 comprises a scanner 14. However, it should be understood that scanning device 10 may comprise any type of device for generating a scanned image including, but not limited to, a facsimile device, scanner or copier, or any combination thereof. In the embodiment illustrated in FIG. 1, system 12 comprises a scanning module 20 for generating a scanned image of a media object 24. In the embodiment illustrated in FIG. 1, media object 24 comprises a bound object 26 such as, but not limited to, a magazine or book, such that system 12 enables automatic detection of an object plane 30 associated with media object 24. For example, as illustrated in FIG. 1, object plane 30 associated with media object 24 extends away from a platen 40 of scanning device 10 a distance indicated generally by 50 as a scan line of scanning module 20 approaches binding area 54 of bound object 26. It should be understood that media object 24 may comprise other types of scanning media such that system 12 enables automatic detection of an object plane associated with such types of media whether or not distance 50 remains constant or varies relative to platen 40. It should also be understood that system 12 may be configured to enable movement of media object 24 relative to a stationary scanning module 20 during a scanning operation or movement of scanning module 20 relative to a stationary media object 24 during a scanning operation.

In the embodiment illustrated in FIG. 1, scanning module 20 comprises a photosensitive sensor 60 adapted to capture image data such as, but not limited to, text, graphics, illustrations, and images via a lens assembly 62 reflected from media object 24 while media object 24 is illuminated by a light source(s) 64. In the embodiment illustrated in FIG. 1, system 12 also comprises a focused light source(s) 70 disposed on scanning module 20 and adapted to illuminate media object 24 via a lens assembly 72. Preferably, light source(s) 64 is selected or otherwise configured to provide substantially uniform illumination to media object 24 to facilitate generation of a scanned image of media object 24 while light source(s) 70 is selected or otherwise configured to provide a relatively small, focused optical signal on media object 24 to form or otherwise generate a generally localized image area on sensor 60.

Embodiments of the present invention advantageously utilize light source 70 to automatically determine a location of object plane 30 of media object 24 without user intervention or complex setup and/or adjustment procedures. For example, embodiments of the present invention automatically determine distance 50 between object plane 30 and platen 40 by generally measuring an area in object plane 30 which is directly proportional to distance 50. Such measurements are used to determine a three-dimensional profile of media object 24 to enable a hardware and/or software correction to compensate for variations in object plane 30 relative to platen 40. For example, scanned locations near a spine of a bound volume often appear darker and the text therein more compressed than other locations as the profile of the scanned page curves away from sensor 60. Thus, where a page of a bound book is scanned, a profile of the scanned page would generally appear flat near the outer edges and approach a peak near the book's spine. Embodiments of the present invention automatically detect or otherwise identify object plane 30 variations to enable image correction via software and/or hardware adjustments or applications. Thus, embodiments of the present invention enable automatic detection of object plane 30 variations or locations for a variety of types of media objects 24 such as, but not limited to, film negatives, bound documents, and documents having stapled, clipped and/or folded over portions.

Figure 2A:
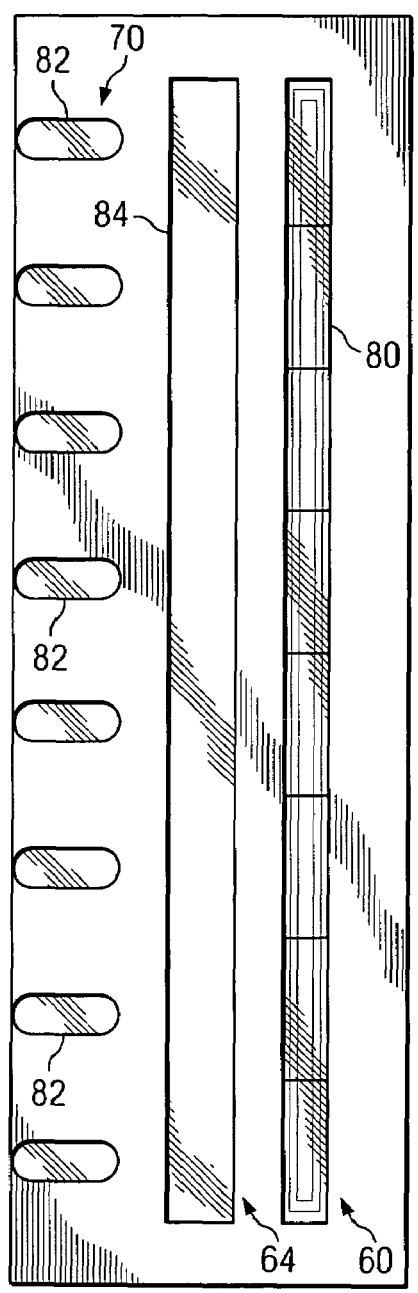
FIGS. 2A and 2B are diagrams illustrating two embodiments of a scanning module of the automatic object plane detection system of FIG. 1 in accordance with the present invention.
Figure 2B:
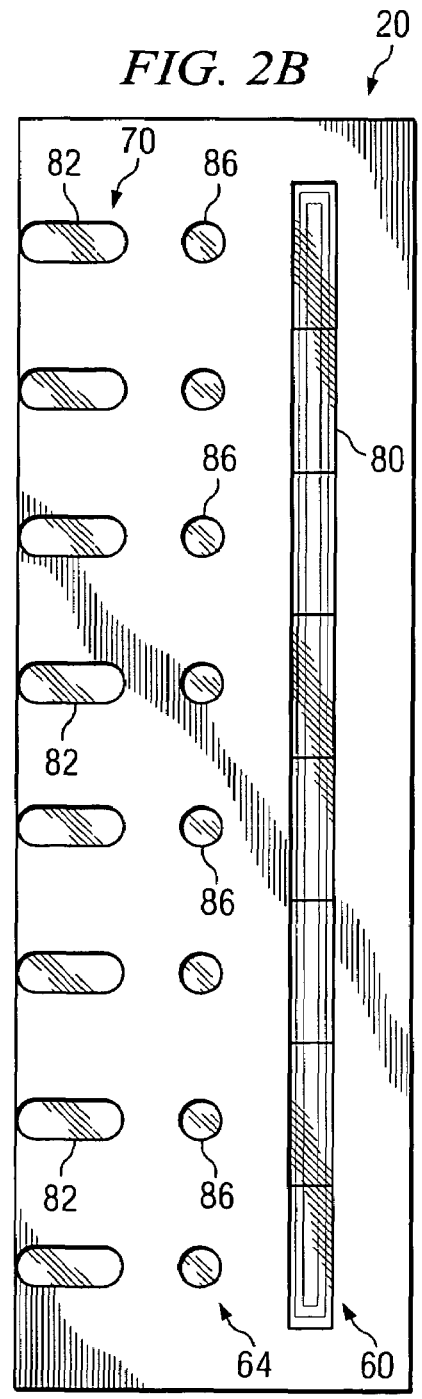

FIGS. 2A and 2B are diagrams illustrating two embodiments of scanning module 20 of FIG. 1 in accordance with the present invention. In the embodiments illustrated in FIGS. 2A and 2B, sensor 60 comprises a contact image sensor array 80. In some embodiments of the present invention, sensor array 80 comprises linearly-arranged sensors or chips, each having a desired quantity of individual sensor elements or pixels. In the embodiments illustrated in FIGS. 2A and 2B, light sources 64 and 70 are positioned adjacent to each other and adjacent to sensor array 80. In the embodiment illustrated in FIGS. 2A and 2B, light source(s) 70 comprise a plurality of light emitting diodes (LEDs) 82. In the embodiment illustrated in FIG. 2A, light source 64 comprises a single cold cathode fluorescent light (CCFL) 84, while in the embodiment illustrated in FIG. 2B, light source 64 comprises a plurality of LEDs 86. Preferably, when configuring sensor array 80 using a plurality of adjacently disposed sensors or chips, light sources 64 and/or 70 are positioned adjacent each sensor or chip. Thus, it should be understood that various types and arrangements of light sources may be used for light sources 64 and 70.

Referring to FIGS. 1 and 2A-2B, in operation, a controller 90 causes scanning module 20 to scan media object 24. Controller 90 is coupled, wirelessly or otherwise, and directly or indirectly, to light source(s) 64 and 70 and sensor 60. In the embodiment illustrated in FIG. 1, a single controller 90 is used to control sensor 60 and activation/deactivation of light sources 64 and 70. However, it should be understood multiple controllers 90 may be used to control sensor 60 and light sources 64 and 70. In some embodiments of the present invention, controller 90 may comprise application-specific integrated circuitry (ASIC), state machines, fuzzy logic, and/or other types of circuitry. In other embodiments of the present invention, controller 90 may comprise software or firmware that includes procedures or functions and, in some embodiments, may be user-programmable as desired.

Figure 3A:
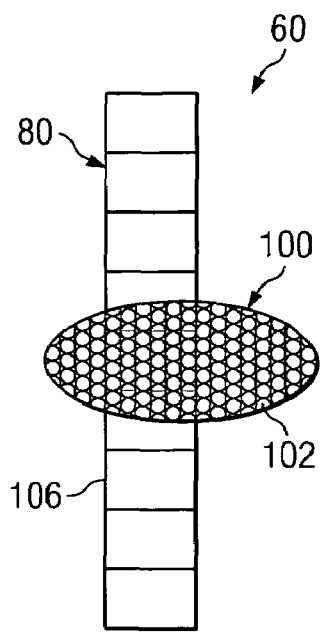
FIGS. 3A and 3B are diagrams illustrating a projected image of an optical signal of the automatic object plane detection system occurring at different object planes in accordance with the present invention.
Figure 3B:
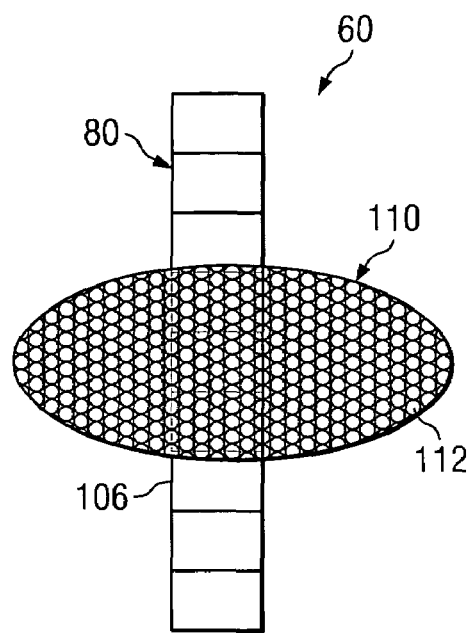

FIGS. 3A and 3B are diagrams illustrating an image of an optical signal of system 12 reflected from object plane 30 and projected onto sensor 60 where object plane 30 is located at two different distances 50 relative to platen 40. As illustrated in FIG. 3A, an image 100 projected onto sensor 60 via light source 70 comprises an area indicated generally by 102. In the embodiment illustrated in FIG. 3A, sensor 60 comprises sensor array 80, which comprises a plurality of chips or sensor elements 106. As illustrated in FIG. 3A, image 100 comprises a measurable area and encompasses or otherwise exposes or extends over a particular quantity of sensor elements 106 (e.g., entire elements and/or portions thereof). Referring to FIG. 3B, an image 110 projected onto sensor 60 via light source 70 comprises an area indicated generally by 112. In the embodiment illustrated in FIG. 3B, object plane 30 is located away from platen 40 a greater distance 50 than in FIG. 3A. Thus, as illustrated in FIGS. 3A and 3B, area 112 corresponding to image 110 encompasses or otherwise exposes a greater area or quantity of sensor elements 106 than area 102 corresponding to image 100. Preferably, lens assemblies 62 and 72 are configured having different magnification properties such that the size of area 102 relative to the quantity of sensor elements 106 on sensor 60 changes as distance 50 changes. Therefore, in operation, system 12 determines distance 50 based on the projected image onto sensor 60 by light source 70.

Figure 4:
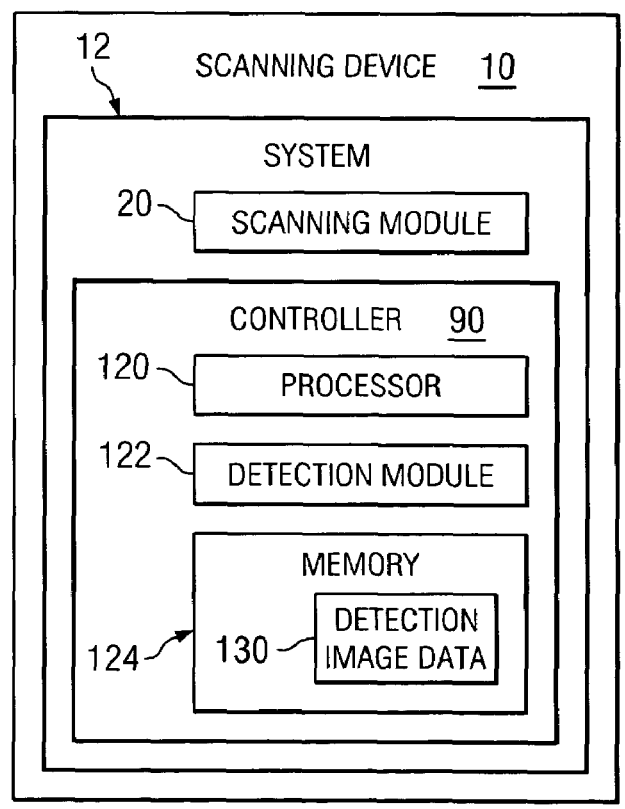
FIG. 4 is a block diagram illustrating an embodiment of an automatic object plane detection system in accordance with the present invention.

FIG. 4 is a block diagram illustrating an embodiment of scanning device 10 incorporating system 12 in accordance with the present invention. In the embodiment illustrated in FIG. 4, system 12 comprises scanning module 20 and controller 90 having a processor 120, a detection module 122, and a memory 124. Detection module 122 comprises hardware, software, or a combination of hardware and software. In operation, detection module 122 interfaces and cooperates with scanning module 20 to obtain image information corresponding to optical signals directed toward object plane 30 of media object 24 by light source 70 and received by sensor 60. Detection module 122 receives the image information from sensor 60 and accesses detection image data 130 to determine distance 50. For example, in some embodiments of the present invention, detection image data 130 comprises information associated with a baseline image having object plane 30 located at the surface of platen 40 (i.e., distance 50 approximately zero) such that the baseline image information comprises information associated with the area and/or the quantity of sensor elements 106 of sensor 60 encompassed or otherwise exposed by an optical signal from light source 70 having object plane 30 coincident with a surface of platen 40. Thus, changes in distance 50 indicating a change in object plane 30 relative to platen 40 are determined by comparing detection image data 130 to image information acquired by sensor 60 via light source 70 to determine whether a change to image area 102 has occurred. However, it should be understood that other methods may be used to determine changes to distance 50 based on image information acquired by sensor 60 via light source 70.

In some embodiments of the present invention, system 12 is configured to perform a registration or calibration operation to establish or otherwise generate detection image data 130. For example, scanning module 20 may be initialized to obtain image information using light source(s) 70 corresponding to media object 24, or a portion thereof, or another object (e.g., a portion of scanning device 10) located coincident with platen 40.

Thus, in operation, the acquired registration or calibration image information is used as a baseline for comparing subsequent image information to determine a location of object plane 30 relative to platen 40.

Thus, light source(s) 70 is intermittently activated during a scanning operation of media object 24 to determine a location of object plane 30 corresponding to media object 24. In some embodiments of the present invention, light source(s) 64 is also intermittently deactivated in coordination with activation of light source(s) 70. For example, in some embodiments of the present invention, light frequencies selected for light sources 64 and 70 may interfere with each other. Thus, in such embodiments of the present invention, light sources 64 and 70 are intermittently and alternately activated. However, it should be understood that, in other embodiments of the present invention, light frequencies for light sources 64 and/or 70 may be selected such that intermittent and/or alternate activation and deactivation of light sources 64 and/or 70 is not required. Based on image information acquired corresponding to light source(s) 70, system 12 automatically determines distance 50 for object plane 30 to facilitate hardware and/or software correction to compensate for variations in object plane 30 relative to platen 40. In some embodiments of the present invention, system 12 is configured to determine distance 50 corresponding to object plane 30 statically and/or dynamically. For example, in some embodiments of the present invention, detection module 122 is configured to acquire image information using light source 70 at a predetermined and generally uniformly-spaced interval across media object 24. Static object plane 30 location detection may be used to accommodate desired scanning speed operation of scanning device 10. In other embodiments of the present invention, detection module 122 is configured to dynamically determine distance 50 corresponding to object plane 30 in response to changes in distance 50. For example, in response to detected changes in distance 50 during a scanning operation, detection module 122 varies (e.g., increases or decreases as applicable) a frequency of image information acquisition using light source(s) 70. Thus, in operation, in response to detecting changes in distance 50 corresponding to a location of object plane 30, detection module 122 dynamically changes the frequency of image detection on media object 24 where distance 50 is determined to more accurately determine a profile of media object 24 relative to platen 40.

Figure 5:
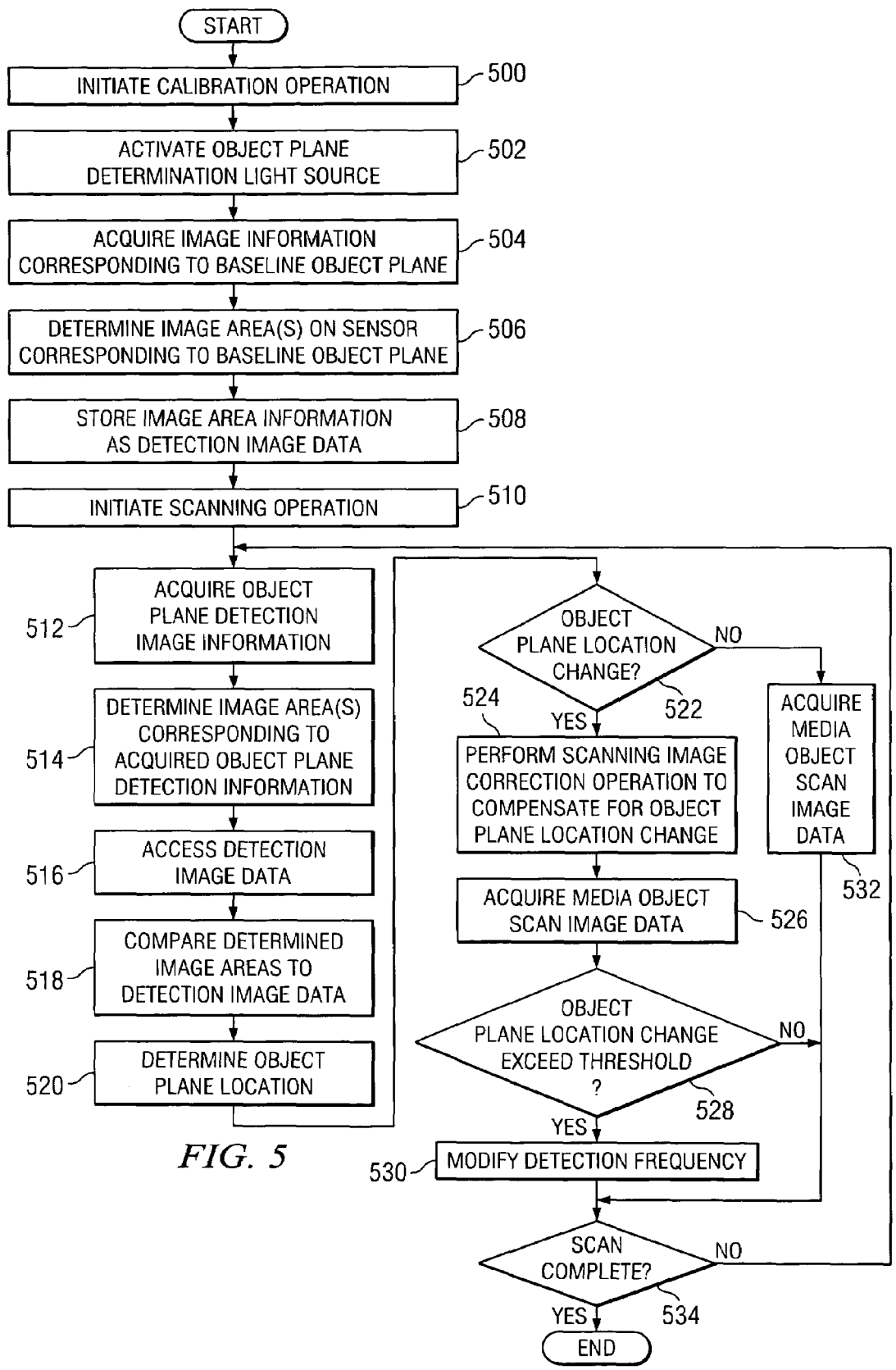
FIG. 5 is a flow diagram illustrating an embodiment of an automatic object plane detection method in accordance with the present invention.

FIG. 5 is a flow diagram illustrating an embodiment of an automatic object plane detection method in accordance with the present invention. Various embodiments may utilize fewer or more steps, and the method may be performed using a number of different implementations or ordering, depending on the application. Generally, FIG. 5 illustrates scanning media object 24 along the x-axis as illustrated in FIG. 1 while determining locations of media object 24 for object plane 30 measurement and determining distance 50 corresponding to the object plane 30 measurement locations. For convenience or ease of description, the example of the method illustrated in FIG. 5 is described using a generally linear-arrayed sensor 60 that spans media object 24 along the y-axis as illustrated in FIG. 1. However, it should be understood that sensor 60 may also be configured to not be so arrayed. For example, in a non-linear-arrayed sensor 60 embodiment, sensor elements may be arranged in an overlapping arrangement forming two lines of non-consecutive dice. In such an embodiment, light sources 64 and 70 are located in two lines corresponding to the sensor element arrangement or, alternatively, the illuminated areas of media object 24 are made large enough to illuminate the areas of media object 24 imaged by the two sensor element lines. Thus, in such an embodiment, the method of FIG. 5 accommodates movement of sensor module 20 along both the x-axis and y-axis as illustrated in FIG. 1.

Referring to FIG. 5, a calibration operation is initiated by scanning device 10 at block 500. At block 502, system 12 activates light source 70 to obtain image information corresponding to object plane 30 disposed coincident with the surface of platen 40. As described above, the calibration image information may be acquired using a portion of scanning device 10 or other object disposed on a surface of platen 40 or otherwise located coincident with the scanning surface of platen 40. At block 504, scanning module 20 acquires image information corresponding to a baseline object plane 30 coincident with a scanning surface of platen 40.

At block 506, controller 90 determines information associated with image area(s) on sensor 60 corresponding to the baseline object plane 30 based on optical signals reflected onto sensor 60 by light source 70. At block 508, controller 90 stores the image area(s) information corresponding to the baseline object plane 30 as detection image data 130 in memory 124. At block 510, a scanning operation for media object 24 is initiated. In the method described above, a calibration operation is performed to acquire image information corresponding to a baseline object plane 30 coincident with a scanning surface of platen 40. However, it should be understood that information corresponding to a baseline object plane 30 coincident with a scanning surface of platen 40 may be predetermined and stored as detection image data 130 in memory 124, thereby alleviating a need for a calibration operation.

At block 512, system 12 activates light source 70 and acquires object plane 30 detection image information. For example, as described above, optical signals from light source 70 are reflected by media object 24 and captured by sensor 60 such that the reflected optical signal results in an image area on sensor 60 used to determine a location of media object 24 relative to platen 40. At block 514, detection module 122 determines image area(s) exposed or otherwise encompassed by the optical signal from light source 70. At block 516, detection module 122 accesses detection image data 130. At block 518, detection module 122 compares or otherwise analyzes the determined image area(s) acquired at block 514 with detection image data 130. At block 520, detection module 122 determines object plane 30 location relative to platen 40, referred to as distance 50 in FIG. 1.

Referring to FIG. 5, at decisional block 522, a determination is made whether a change of location of object plane 30 has occurred. If the location of object plane 30 has changed, the method proceeds to block 524, where a scanning image correction operation is performed to compensate for object plane 30 location change. For example, as described above, a software and/or hardware modification may be performed by scanning device 10 to compensate for changes in distance 50 corresponding to a location of object plane 30. At block 526, scanning module 20 acquires image data corresponding to a scan of media object 24.

At decisional block 528, a determination is made whether the change in object plane 30 location exceeds a predetermined threshold. For example, if the rate of change of distance 50 corresponding to a location of object plane 30 exceeds a predetermined threshold or frequency, system 12 may be configured to dynamically respond to the changes in object plane 30 location change. Thus, if object plane 30 location change has exceeded a predetermined threshold, the method proceeds to block 530, where a frequency of object plane 30 detection measurements is modified. For example, in some embodiments of the present invention, system 12 is configured to increase a rate of object plane 30 detection measurements in response to an increased rate in object plane 30 location change. The method then proceeds to block 534. If the change in object plane 30 location has not exceeded a predetermined threshold at decisional block 528, the method proceeds to block 534.

At decisional block 522, if a location of object plane 30 has not changed, the method proceeds to block 532, where scanning module 20 performs a scanning operation to acquire image information corresponding to media object 24. The method then proceeds to decisional block 534, where a determination is made whether the scanning operation is complete. If the scanning operation is not complete, the method proceeds to block 512. If the scanning operation is complete, the method ends.

Thus, embodiments of the present invention enable automatic object plane detection. For example, in some embodiments of the present invention, a focused light source is used to form an image area on a sensor such that the image area can be analyzed to determine a location of the object plane. Thus, in this embodiment of the present invention, aspects of the image area are a function of the relative location of the object plane to a platen. Thus, embodiments of the present invention are used to analyze the image area to determine a location of the object plane corresponding to a media object. It should also be understood that in embodiments of the method of the present invention described in FIG. 5, certain functions may be omitted, combined, or accomplished in a sequence different than depicted in FIG. 5. Also, it should be understood that the method depicted in FIG. 5 may be altered to encompass any of the other features or aspects described elsewhere in the specification.

What is claimed is:

1. An object plane detection method, comprising:
    illuminating an image area on a photosensitive sensor via light reflected from a media object;
    determining a location of an object plane corresponding to the media object based on a size of the image area; and
    modifying a frequency of illuminating the media object for generating the image area based on a rate of chance of the location of the object plane.

2. The method of claim 1, wherein determining comprises comparing the size of the image area to detection image data.

3. The method of claim 1, wherein illuminating comprises activating a focused light source toward the media object.

4. The method of claim 1, wherein determining comprises determining a quantity of sensor elements of the photosensitive sensor exposed to the image area.

5. The method of claim 1, further comprising determining whether a change in the location of the object plane has occurred.

6. The method of claim 1, further comprising determining whether a change in the size of the image area has occurred.

7. The method of claim 1, further comprising determining whether a change in the location of the object plane has exceeded a predetermined threshold.

8. An object plane detection system, comprising:
    a light source adapted to illuminate a media object to generate an image area on a photosensitive sensor;
    a detection module adapted to determine a location of an object plane corresponding to the media object based on a size of the image area, the detection module adapted to modify a frequency of illuminating the media object to generate the image area based on a rate of change to the location of the object plane.

9. The system of claim 8, wherein the light source comprises a focused light source.

10. The system of claim 8, the detection module adapted to compare the size of the image area to detection image data to determine the location of the object plane.

11. The system of claim 8, the detection module adapted to intermittently illuminate the media object to generate the image area during a scanning operation of the media object.

12. The system of claim 8, the detection module adapted to determine the location of the object plane based on a quantity of sensor elements of the photosensitive sensor exposed to the image area.

13. The system of claim 8, the detection module adapted to determine whether a change to the location of the object plane has occurred.

14. The system of claim 8, further comprising another light source adapted to illuminate the media object for obtaining a scanned image of the media object.

15. The system of claim 8, the detection module adapted to determine whether a change to the location of the object plane has exceeded a predetermined threshold.

16. The system of claim 8, the detection module adapted to control an interval for illuminating the media object to generate the image area during a scanning operation of the media object.

17. The system of claim 8, the detection module adapted to determine whether a change in the size of the image area has occurred.

18. An object plane detection system, comprising:
    means for illuminating an image area on a photosensitive sensor via light reflected from a media object;
    means for determining a location of an object plane corresponding to the media object based on a size of the image area; and
    means for modifying a frequency of illuminating the media object to generate the image area in response to a change in the location of the object plane exceeding a predetermined threshold.

19. The system of claim 18, further comprising means for determining whether a change in the location of the object plane has occurred.

20. The system of claim 18, wherein the determining means comprises means for comparing the size of the image area to detection image data.

21. The system of claim 18, wherein the determining means comprises means for determining a quantity of sensor elements of the photosensitive sensor exposed to the image area.

22. An object plane detection system, comprising:
    a light source adapted to intermittently illuminate a media object during a scanning operation to generate an image area on a photosensitive sensor; and
    a detection module adapted to determine a location of an object plane corresponding to the media object based on the image area exposed on the photosensitive sensor, the detection module adapted to modify a frequency of illuminating the media object to generate the image area based on a rate of change to the location of the object plane.

23. The system of claim 22, the detection module adapted to determine the object plane based on a quantity of sensor elements of the photosensitive sensor exposed to the image area.

24. The system of claim 22, the light source comprising a focused light source.

25. The system of claim 22, the detection module adapted to compare the size of the image area to detection image data to determine the location of the object plane.

26. The system of claim 22, the detection module adapted to determine whether a change to the location of the object plane has occurred.

27. The system of claim 22, further comprising another light source adapted to illuminate the media object for obtaining a scanned image of the media object.

28. The system of claim 22, the detection module adapted to determine whether a change to the location of the object plane has exceeded a predetermined threshold.

29. An object plane detection system, comprising:
    a light source adapted to illuminate a portion of a media object to generate an image area on a photosensitive sensor; and
    a detection module adapted to determine a location of an object plane corresponding to the media object based on the image area exposed on the photosensitive sensor, the detection module adapted to modify a frequency of illuminating the media object to generate the image area based on a rate of change to the location of the object plane.

30. The system of claim 29, the detection module adapted to determine the object plane based on a size of the image area.

31. The system of claim 29, the detection module adapted to determine the object plane based on a quantity of sensor elements of the photosensitive sensor exposed to the image area.

32. The system of claim 29, the detection module adapted to compare the image area to detection image data to determine the location of the object plane.

33. The system of claim 29, the detection module adapted to determine whether a change to the location of the object plane has occurred.

34. The system of claim 29, the detection module adapted to determine whether a change to the location of the object plane has exceeded a predetermined threshold.

35. The system of claim 29, further comprising another light source adapted to illuminate the media object for obtaining a scanned image of the media object.

36. An object plane detection system, comprising:
a first light source adapted to illuminate a media object to obtain a scanned image of the media object; and
a second light source adapted to intermittently illuminate the media object during a scanning operation to enable detection of a location of an object plane corresponding to the media object, a frequency of intermittent illumination of the second light source dynamically controlled based on a change to the location of the object plane.

37. The system of claim 36, the second light source comprising a focused light source.

38. The system of claim 36, the second light source adapted to generate a localized image area on a photosensitive sensor.

39. The system of claim 36, further comprising a detection module adapted to control a frequency of illumination of the second light source.

40. The system of claim 36, further comprising a detection module adapted to modify a frequency of illumination for the second light source in response to a change in the location of the object plane.

41. The system of claim 36, further comprising a photosensitive sensor adapted to receive light reflected by the media object from the first and second light sources.

42. The system of claim 36, further comprising a detection module adapted to perform a calibration operation to generate detection image data used for determining the location of the object plane.

* * * * *

UNITED STATES PATENT AND TRADEMARK OFFICE
CERTIFICATE OF CORRECTION

PATENT NO.         : 7,253,427 B2                                    Page 1 of 1
APPLICATION NO. : 10/988870
DATED              : August 7, 2007
INVENTOR(S)        : Kurt E. Spears et al.

It is certified that error appears in the above-identified patent and that said Letters Patent is hereby corrected as shown below:

In column 7, line 22, in Claim 1, delete "chance" and insert -- change --, therefor.

Signed and Sealed this

Eleventh Day of August, 2009

David J. Kappos
*Director of the United States Patent and Trademark Office*